(12) United States Patent
Fukuda et al.

(10) Patent No.: US 7,597,348 B2
(45) Date of Patent: Oct. 6, 2009

(54) AUTOMOTIVE AIRBAG DEVICE

(75) Inventors: Masataka Fukuda, Ibaraki (JP); Yuichiro Yoshida, Ibaraki (JP); Makoto Higano, Ibaraki (JP); Mitsuo Nogami, Ibaraki (JP); Taro Shimizu, Ibaraki (JP)

(73) Assignee: Autoliv Development AB, Vargarda (SE)

( * ) Notice: Subject to any disclaimer, the term of this patent is extended or adjusted under 35 U.S.C. 154(b) by 202 days.

(21) Appl. No.: 10/581,926

(22) PCT Filed: Nov. 29, 2004

(86) PCT No.: PCT/JP2004/017688

§ 371 (c)(1),
(2), (4) Date: Apr. 6, 2007

(87) PCT Pub. No.: WO2005/056348

PCT Pub. Date: Jun. 23, 2005

(65) Prior Publication Data

US 2007/0257475 A1    Nov. 8, 2007

(30) Foreign Application Priority Data

Dec. 8, 2003    (JP) ............................. 2003-409340

(51) Int. Cl.
*B60R 21/16* (2006.01)
*B60R 21/22* (2006.01)
*B60R 21/26* (2006.01)
*B60R 21/213* (2006.01)

(52) U.S. Cl. .................... 280/730.2; 280/736; 280/740; 280/742

(58) Field of Classification Search ............. 280/730.2, 280/736, 740, 742, 749
See application file for complete search history.

(56) References Cited

U.S. PATENT DOCUMENTS

| 6,199,898 | B1 | 3/2001 | Masuda et al. |
| 6,273,456 | B1 | 8/2001 | Heigl |
| 6,293,581 | B1 | 9/2001 | Saita et al. |
| 6,450,529 | B1 | 9/2002 | Kalandek et al. |
| 6,811,184 | B2 * | 11/2004 | Ikeda et al. ................. 280/742 |

(Continued)

FOREIGN PATENT DOCUMENTS

AU    5375101    1/2002

(Continued)

*Primary Examiner*—Ruth Ilan
*Assistant Examiner*—James English
(74) *Attorney, Agent, or Firm*—Brinks Hofer Gilson & Lione

(57) ABSTRACT

An airbag is formed from fabric layers joined at a seam, and gas generator inflates the airbag by means of gas expelled from the gas generator's insertion end which has been inserted into the airbag. A gas guide is formed in the airbag in order to direct gas from the gas generator into the airbag and includes a pouch-shaped gas guide member in which are formed gas injection nozzles and an attachment orifice. The insertion end of the gas generator is inserted into the attachment orifice with the gas injection nozzles facing an interior of the airbag. A convex-shaped seam is included where the fabric layers are joined, and is disposed in opposition to the gas guide member. The gas guide member comes into contact with the convex-shaped seam as a result of the pressure of the flow of gas from the gas generator through the gas guide member.

9 Claims, 4 Drawing Sheets

U.S. PATENT DOCUMENTS

| | | | |
|---|---|---|---|
| 6,846,010 B2 * | 1/2005 | Enders | 280/730.2 |
| 6,866,293 B2 * | 3/2005 | Ogata | 280/730.2 |
| 6,971,665 B2 * | 12/2005 | Tanaka | 280/729 |
| 7,021,652 B2 * | 4/2006 | Kumagai et al. | 280/729 |
| 7,125,038 B2 * | 10/2006 | Gammill | 280/728.2 |
| 2002/0020991 A1 | 2/2002 | Tanase et al. | |
| 2002/0074775 A1 | 6/2002 | Ryan | |
| 2002/0105174 A1 | 8/2002 | Tanase et al. | |
| 2002/0140211 A1 | 10/2002 | Takahara | |
| 2002/1075504 | 11/2002 | Tanase et al. | |
| 2002/0195804 A1 | 12/2002 | Hess et al. | |
| 2003/0006590 A1 | 1/2003 | Aoki et al. | |
| 2003/0230878 A1 * | 12/2003 | Inoue | 280/730.2 |

FOREIGN PATENT DOCUMENTS

| | | |
|---|---|---|
| DE | 199 39 618 A1 | 5/2000 |
| DE | 200 15 065 U1 | 1/2001 |
| DE | 10225677 A1 | 1/2003 |
| EP | 1 228 930 A2 | 8/2002 |
| EP | 1260414 A2 | 11/2002 |
| EP | 1 310 409 A2 | 5/2003 |
| JP | 2000-335356 A | 12/2000 |
| JP | 2000-355261 | 12/2000 |
| JP | 2001-270413 | 10/2001 |
| JP | 2002-362291 | 12/2002 |
| JP | 2003-048503 | 2/2003 |
| JP | 2003-063348 | 3/2003 |
| JP | 2003-072509 | 3/2003 |
| JP | 2003-146176 | 5/2003 |
| JP | 2003-205811 | 7/2003 |
| JP | 2003-291766 | 10/2003 |
| WO | WO 02/00476 A1 | 1/2002 |
| WO | WO 03/051679 A1 | 6/2003 |
| WO | WO 03/051680 A1 | 6/2003 |
| WO | WO 2004/000609 A1 | 12/2003 |
| WO | WO 2004/007250 A1 | 1/2004 |
| WO | WO 2004/101328 A1 | 11/2004 |

* cited by examiner

AUTOMOTIVE AIRBAG DEVICE

CROSS REFERENCE TO RELATED APPLICATIONS

This application claims priority to PCT/JP2004/017688 filed Nov. 29, 2004 and to Japanese Patent Application No. 2003-409340 filed Dec. 8, 2003.

BACKGROUND

1. Field of the Invention

The present invention relates to an airbag for use in motor vehicles. In particular it relates to a side airbag which uses a guide member to stabilize the flow of gas emitted from a gas generator into the airbag.

2. Description of Related Art

An airbag installed on the sides of the interior of a vehicle passenger compartment, and in particularly extended from the front seat region to the rear seat region, is commonly called a "side airbag" or "curtain airbag" in the art. When a side impact occurs, gas inflates the airbag which then expands, drops down from the passenger compartment ceiling, and covers the window, much like a curtain, in order to protect the passenger from injury. An airbag utilizing this type of structure is formed from one piece of fabric-like material folded over on itself, or two mutually overlaid fabric layers, after which the pieces of material are joined by adhering, welding, or sewing to form a bag-like structure.

In a conventional curtain-type automotive airbag device, inflating gas simply enters the airbag at the opening in the airbag where the insertion end of the gas generator is attached, the gas flow into the airbag only being controlled by the partitions formed at the seams where the fabric layers have been joined. This operation results in the adverse effect of an unstable gas flow within the airbag in the periphery of the insertion end of the gas generator, and thus indicates an area where the design of the airbag can be improved.

A countermeasure applied to rectify this problem has been to install a specially designed gas guide member in the airbag and to attach it to the insertion end of the gas generator as means of separating or directing the gas in specific directions therethrough. It has been assumed that the gas guide member may be made from the same flexible material as the airbag in order to be able to install the airbag to the vehicle body in the form of a rolled up spiral or folded over configuration.

It has been determined, however, that forming the gas guide member from a soft material results in the gas guide member vibrating with unstable oscillations due to the pressure of the flowing gas. This vibration has a destabilizing effect on the gas flow direction, and thus defeats the purpose of the gas guide member. Moreover, the high temperature gas may damage the airbag seams, especially those seams placed in proximity to the insertion end of the gas generator. These factors have the potential to adversely affect the performance and dependability of airbag operation.

In consideration of the aforesaid shortcoming of the conventional airbag structure, it is apparent there exists a need for an automotive airbag incorporating an improved gas guide member, to stabilize the flow of gas into the airbag.

SUMMARY

The automotive side impact airbag of the present invention is primarily formed by joining mutually facing fabric layers, and including a gas generator used to inflate the airbag part by injecting gas therein, said gas generator having an insertion end which is inserted into and disposed within the airbag. The airbag includes a gas guide as means of guiding the flow of gas from the gas generator into the airbag. A gas guide member is also included incorporating an attachment orifice into which the insertion end part of the gas generator is inserted, and further incorporating gas injection nozzles facing an interior of the airbag. Finally, a convex seam, which is formed as a mutually joined part of the fabric layers, is located in opposition to the gas guide, such that gas flowing into the airbag from the gas generator, when the airbag is being inflated, causes the gas guide member to come into contact with the convex seam.

It is preferable that the gas guide member is equipped with a gas discharge tube which comes into contact with the convex seam when the airbag is being inflated. The gas discharge tube acts to change the direction of gas flow, which is supplied by the gas generator through the gas guide during inflation, to a transverse direction into the interior of the airbag. The gas injection nozzles are provided with the gas discharge tube.

It is preferable that at least one gas injection nozzle is formed over each side of a top part of the convex seam.

It is preferable that the part of the convex seam facing the gas guide member is approximately triangular in shape and the top part thereof is disposed facing the gas guide part in close proximity. It must be pointed out here that this approximate triangular shape is substantially a 3-sided shape. It is also preferable that each corner of the triangular shape is rounded off so as to form a curve through which adjacent sides of the triangle smoothly merge into each other. It is further preferable that the part of the gas discharge tube between the gas discharge nozzles comes into contact with and straddles the two inclined sides of the top part of the convex seam during airbag inflation.

It is preferable that the width of the convex seam facing the gas guide member is from 80 to 120% the width of the gas discharge tube of the gas guide member, and that the clearance between the gas guide member and convex seam is less than 20 mm.

It is further preferable that the gas guide member is made from an expandable material, and that it is designed to expand, as a result of the flow of gas therethrough, toward the convex seam a distance at least 5 mm greater than the clearance therebetween.

The airbag of the present invention has the effect of stabilizing the flow of gas into an airbag equipped with a gas guide member as a means of directing the flow of gas from an insertion end of a gas generator into the airbag.

Further objects, features and advantages of this invention will become readily apparent to persons skilled in the art after a review of the following description, with reference to the drawings and claims that are appended to and form a part of this specification

DETAILED DESCRIPTION

Figure 1:
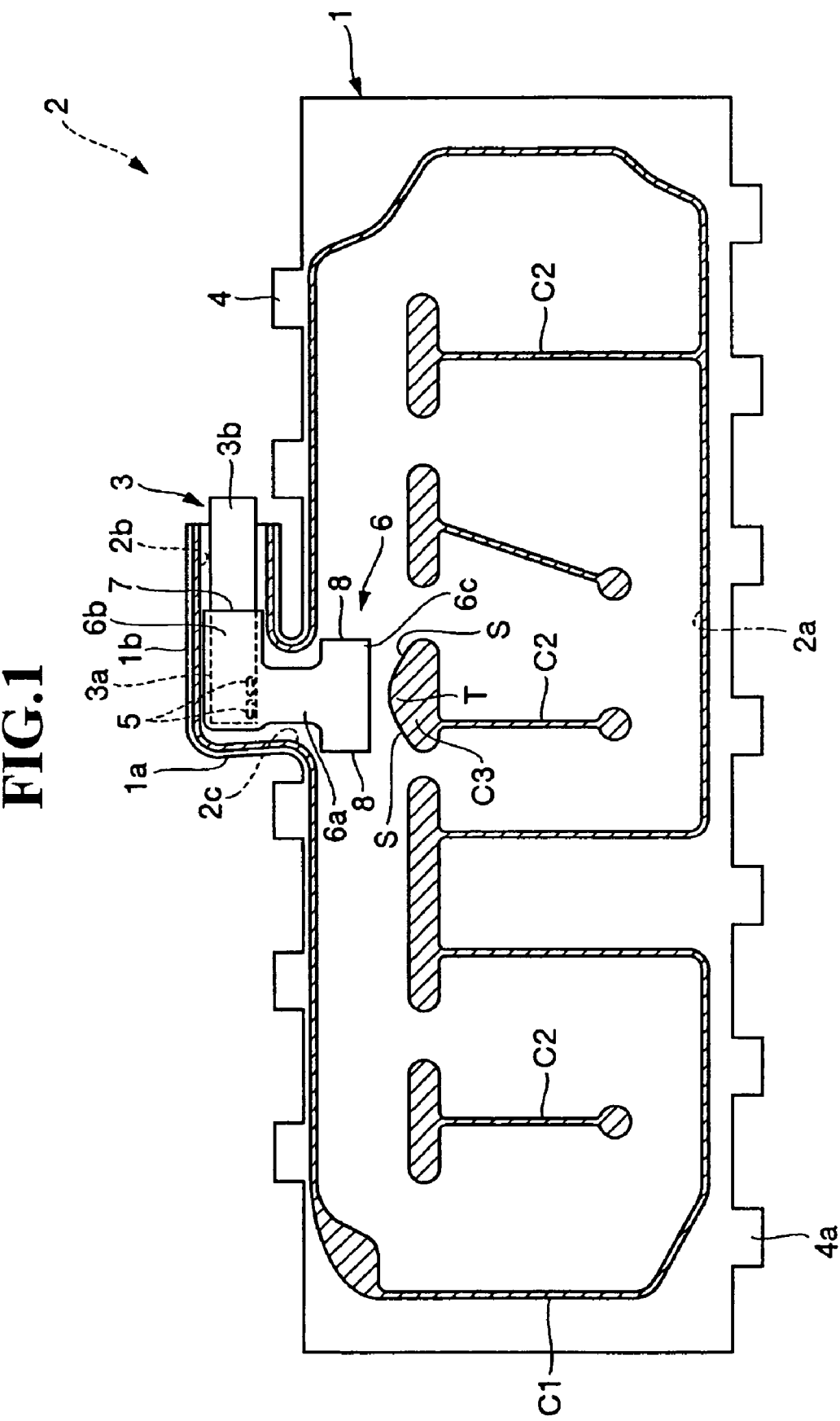
FIG. 1 is section view of the preferred embodiment of the automotive airbag according to the present invention illustrating the airbag in a undeployed condition with one of the two fabric layers removed for clarity.
Figure 2:
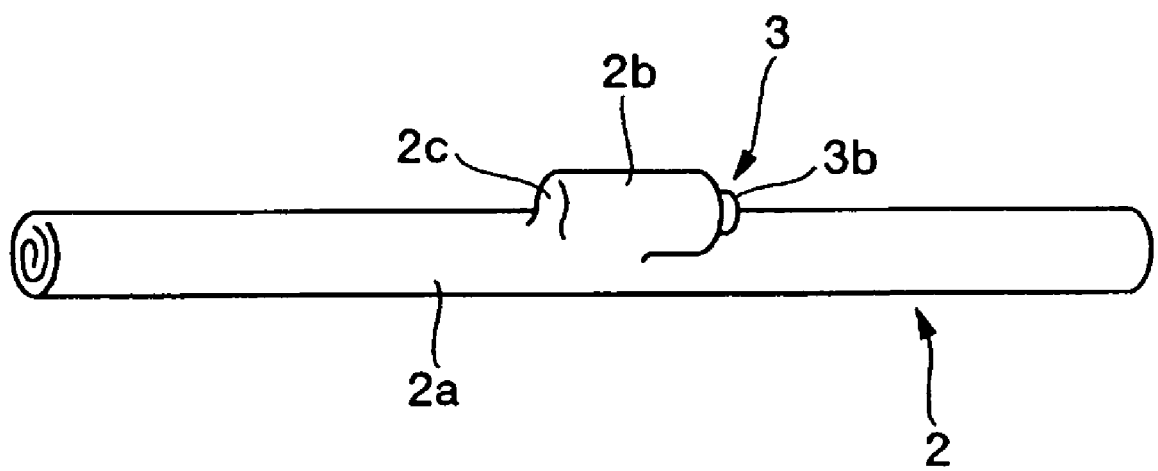
FIG. 2 is a perspective view of the FIG. 1 airbag in a rolled up condition.

The following provides a detailed description of a preferred embodiment of the invention with reference to the attached drawings. The automotive airbag according to the present invention is embodied here in the form of a side impact or curtain airbag comprising, as shown in FIGS. 1 and 2, a pouch-shaped airbag 2 formed from fabric layers 1, and a gas generator 3 which inflates the airbag 2 by injecting gas therein.

The embodiment of the airbag 2 described in the drawings is constructed by joining the overlapping and mutually facing fabric layers 1. Each fabric layer 1 is formed to a length approximately equivalent to the combined length of the front and rear seats in the fore-aft direction, and to a height sufficient to cover the vertical dimension of the side windows. Fastening tabs 4 are located on the perimeter of the airbag 2 as means of attaching the airbag 2 to the vehicle body, and tie tabs 4a are also provided on the perimeter of the airbag 2 as means of maintaining the airbag 2 in a rolled up configuration as shown in FIG. 2. Moreover, a vertical passage 1a is formed as an upwardly protruding part of the airbag 2 in the center of the upper edge of each piece 1, and a horizontal passage 1b is formed as a horizontal part continuing in the horizontal direction from the vertical passage 1a.

The fabric layers 1 are mutually joined along their edges to form a loop-shaped bag seam C1 which extends from the vertical passage 1a to the tip of the horizontal passage 1b with the bag seam C1 being open at the tip of the horizontal passage 1b. In addition to being defined by the bag seam C1, an interior of the airbag 2 is partitioned by joining the fabric layers 1 at partition seams C2 which have the purpose of controlling the flow of gas from the gas generator 3 into the airbag 2. The airbag 2 thus includes airbag body 2a which is internally partitioned at specific regions, gas generator attachment which is defined by the horizontal passage 1b and into which the gas generator 3 is inserted, and gas guide part 2c which is formed as part of the vertical passage 1a and connects the airbag body 2a with the gas generator attachment 2b.

The fabric layers 1 may be mutually joined by any appropriate method such as gluing, welding, stitching etc. FIG. 1 shows a section view through the seam c1 of the airbag 2. The airbag 2 may be formed not only by overlapping and joining the two fabric layers 1, but also by folding a single fabric layer over upon itself and joining parts of the two contacting surfaces, or by forming the bag structure when fabric is fabricated or woven.

One end of the cylindrically shaped gas generator 3 includes an insertion end 3a, which includes gas discharge ports 5, and is inserted into the gas generator attachment. The other end is formed as a connector part 3b to which gas generator actuation wiring is connected and which is exposed externally to the gas generator attachment. FIG. 2 illustrates the airbag 2 in a rolled up configuration with the gas generator 3 attached, and shows the gas generator attachment protruding from the rolled up airbag body 2a.

Returning to FIG. 1, a gas guide member 6 extends from the gas generator attachment, through at least the gas guide part 2c, into the pouch-shaped airbag body 2a. The gas guide member 6, which is an expandable pouch-like structure constructed from a fabric material, includes a cylindrical trunk 6a disposed within the gas guide part 2c, a cylindrical receiver 6b formed along the gas generator attachment at the top of the cylindrical trunk 6a, and a cylindrical gas discharge tube 6c formed as a bidirectional horizontally extending tube-like structure at the lower end of the cylindrical trunk 6a above the partition seam C2 within the airbag body 2a. The gas guide member 6 is constructed from an expandable material, for example, a nylon 6.6 700 dtex silicone coated fabric.

Figure 4:
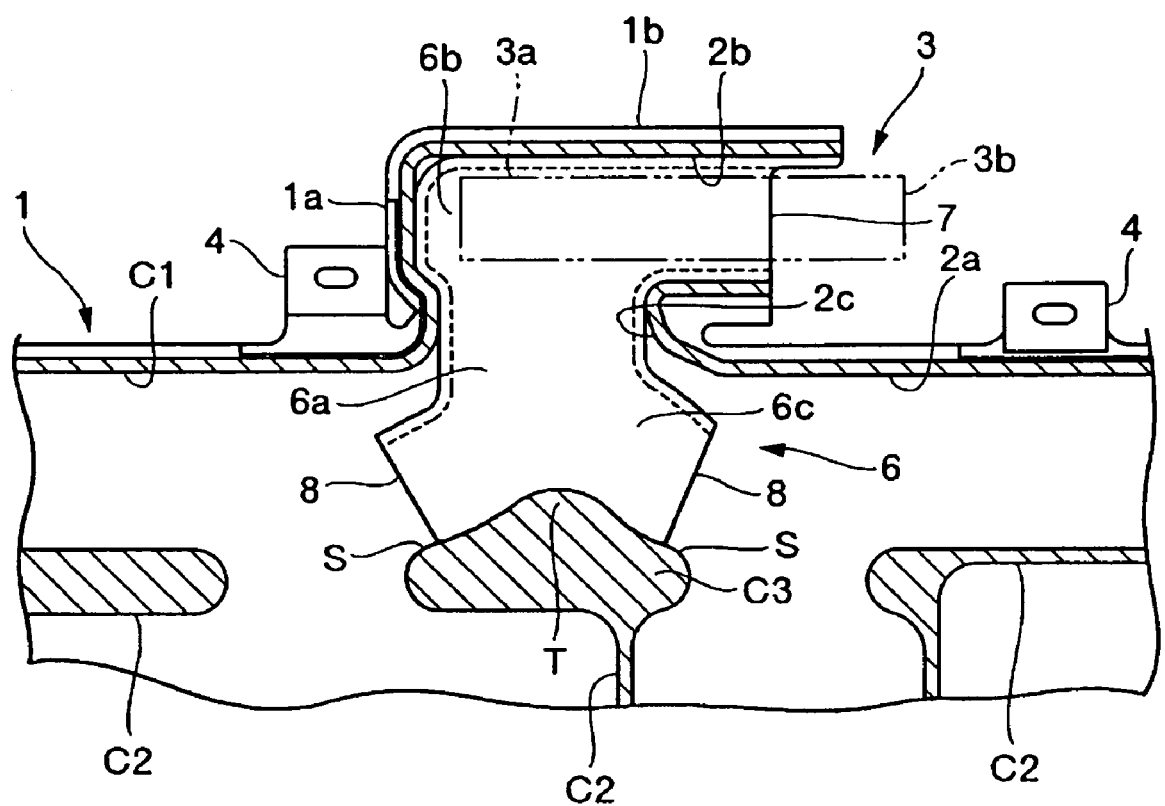
FIG. 4 is an enlarged cross section of the gas guide member of FIG. 1 during airbag deployment.

An attachment orifice 7 is formed at the end of the cylindrical receiver 6b. The insertion end 3a of the gas generator 3, which inserts into the gas generator attachment part 2b, installs into the cylindrical receiver 6b of the gas guide member 6 through the attachment orifice 7, thereby securing the gas discharge ports 5 towards the cylindrical trunk 6a. Gas injection nozzles 8, which comprise the left and right parts of the ends of the cylindrical gas discharge tube 6c within the interior of the airbag body 2a, are transversely disposed on a plane opposing the direction of incoming gas, and direct gas from the gas generator 3 into the airbag body 2a. In this embodiment, the left and right ends of the gas discharge tube 6c form the horizontally oriented the gas injection nozzles 8. In this embodiment, a convex seam C3 is formed within the airbag 2 and disposed in opposition to the gas guide part 2c. The convex seam C3 is formed as a joint of mutually bonded portions of the fabric layers 1, and has a protruding rounded top part disposed opposite the gas guide part 2c. During inflation, the inflow of gas from the gas generator 3 causes the gas guide member 6 to come into contact with the convex seam C3. More specifically, the gas inflow pressure from the gas generator 3 causes the gas guide member 6, which is made of an expandable material, to expand as a result of the cylindrical trunk 6a extending in upward and downward directions, thus resulting in the gas guide member 6 coming into contact with the convex seam C3. The convex seam C3 is formed with the same joining method used to create the partition seams C2. As shown in the drawing, the convex seam C3 is formed as the integral upper portion of the partition seam C2 disposed in proximity to the gas guide member 6. To describe further, the convex seam C3 is approximately triangular in shape with its upward facing corner part formed as a top part "T" which has a smoothly curved profile disposed in close proximity to the transverse center of the gas discharge tube 6c of the gas guide member 6. During inflation, the part of the cylinder-shaped gas discharge tube 6c between the two gas injection nozzles 8 comes into contact with and straddles two inclined sides "S" of the top part "T". In other words, the two gas injection nozzles 8 are formed so as to move into contact with the convex seam C3 with a type of pinching action as shown in FIG. 4. In order to smooth the flow of gas entering the airbag 2, it is preferable that the other two corner parts of the triangular shaped seam C3 have curved profiles in the same manner as that of the top part "T".

Figure 3:
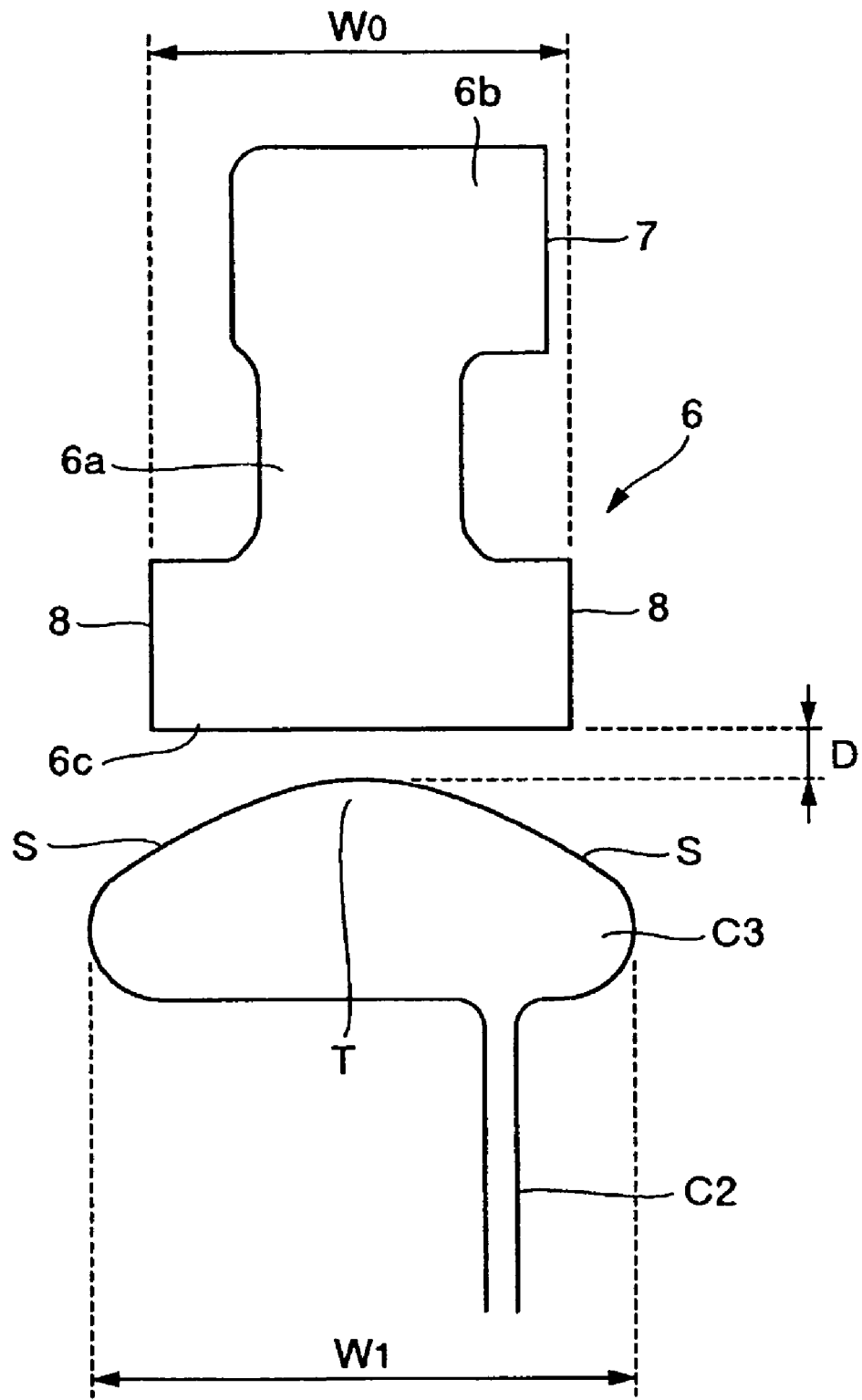
FIG. 3 is a line drawing describing the positional relationship between the gas guide member and the convex seam.

FIG. 3 provides a detailed illustration of the dimensional relationship between the gas discharge tube 6c of the gas guide member 6 and the convex seam C3 of the present embodiment. Firstly, it is preferable that a dimension W1, that is, the width of the convex seam C3 facing the gas discharge tube 6c, be from 80 to 120% of the width of a dimension W0 which is the width of the gas discharge tube 6c facing the convex seam C3. Should the width of the convex seam C3 be made to a dimension exceeding 120% of the width of the gas discharge tube 6c, there is a possibility that the gas exiting from the gas injection nozzles 8 will come into direct contact with and thermally damage the convex seam C3. Conversely, should the width of the convex seam C3 be made to a dimension less than 80% of the width of the gas discharge tube 6c, there is a possibility that the gas discharge tube 6c, although in contact with the convex seam C3, will oscillate in an unstable manner, thus resulting in the gas potentially contacting and thermally damaging seams C1 and C2.

Moreover, it is preferable that dimension "D", which is the clearance between the gas discharge tube 6c of the gas guide member 6 and the convex seam C3 (particularly the top part "T"), be less than 20 mm. The gas guide member 6, which is made from an expandable material, expands approximately 25 mm along a vertical plane when directing the gas flow from the gas generator 3. Considering this extent of expansion, it has been determined that a clearance of less than 20 mm provides complete contact of the gas discharge tube 6c against the convex seam C3. If clearance "D" exceeds 20 mm, there will be insufficient contact of the gas discharge tube 6c against the convex seam C3, thus causing the gas discharge tube 6c to flutter uncontrollably. While it has been determined that dimension "D" should be less than 20 mm to assure adequate contact between the two components, experimental results have shown that a dimension of from 5 to 8 mm is preferred, and that a dimension of 5.3 mm provides the most stable and dependable contact between the gas discharge tube 6c and the convex seam C3.

The above dimensions are but one exemplary embodiment of the present invention. In general, depending on the material characteristics of the gas guide member 6, it is preferable that the gas flow-through pressure be able to expand the gas guide member 6 toward the convex seam C3 at least 5 mm greater than dimension "D". In the example above, this value is obtained by subtracting the 20 mm clearance dimension from the previously noted 25 mm of extension of the gas guide member 6, and is done for the same reason as stated previously.

The automotive airbag device invention described in this embodiment is assembled by placing the gas guide member 6 within the vertical passage 1a and horizontal passage 1b on one of the two fabric layers 1. The previously noted clearance "D" is thus formed between the gas guide member 6 and convex seam C3 as shown in FIG. 1. Next, the other fabric-like material piece 1 is placed over the fabric-like material piece 1 onto which the gas guide member 6 was placed, and both pieces are joined to form the airbag 2. The insertion end 3a of the gas generator 3 is then inserted into the gas generator attachment of airbag 2, and enters the cylindrical receiver 6b of the gas guide member 6 via the attachment orifice 7. The airbag body 2a is then rolled up into the configuration shown in FIG. 2, and is thus ready for installation to the vehicle.

The following will describe operation of the airbag as structured according to the current embodiment. Once the gas generator 3 activates, the gas emitted from the gas discharge ports 5 flows through and thereby pressurizes the interior of the gas guide member 6. The pressure of the flowing gas expands the gas guide member 6, and the gas simultaneously flows into the airbag body 2a through the gas injection nozzles 8, and is distributed within the airbag body 2a via the partition seams C2.

As shown in FIG. 4, the flow of gas from the gas generator 3 flows through and expands the gas guide member 6, the cylindrical trunk 6a elongates toward the convex seam C3, and the gas discharge tube 6c moves downward and contacts the top part of the convex seam C3, thereby eliminating the clearance formerly existing there between. By having the gas discharge tube 6c contact the convex seam C3, uncontrolled oscillation of the gas discharge tube 6c is suppressed and the outflow of gas therefrom is stabilized, thus eliminating the problem of gas from the gas injection nozzles 8 striking and thermally damaging the partition seams C2.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. An automotive airbag device comprising:
  a side impact airbag having an interior formed by joining mutually facing fabric layers,
  a gas generator used to inflate the airbag by injecting gas therein, the gas generator having an insertion end which is inserted into and disposed within a gas guide of the airbag configured to direct the flow of gas from the gas generator into the airbag,
  the gas guide including a gas guide member having an attachment orifice into which the insertion end of the gas generator is inserted, and also including gas injection nozzles facing the interior of the airbag, and
  a convex seam formed by a mutually joined part of the fabric layers, a top of the convex seam disposed in opposition to and facing the gas guide member, wherein
  the gas flowing into the airbag from the gas generator, when the airbag is being inflated, causes the gas guide member to come into contact with at least the top of the convex seam.

2. The automotive airbag device according to claim 1, wherein the gas guide member includes a gas discharge tube which includes the gas injection nozzles, and the gas discharge tube comes into contact with at least the top of the convex seam in response to the inflation of the airbag so as to change the direction of gas flow into the airbag from the gas generator through the gas guide member.

3. The automotive airbag device according to claim 1, wherein at least one gas injection nozzle of the gas guide member is formed over each side of the top of the convex seam.

4. The automotive airbag device according to claim 3, wherein the convex seam is approximately triangular in shape and the top of the convex seam is disposed facing the gas guide member in close proximity.

5. The automotive airbag device according to claim 4, wherein a region of the gas discharge tube between the gas injection nozzles comes into contact with and straddles two inclined sides of the top of the convex seam during the time that the airbag is being inflated.

6. The automotive airbag device according to claim 2, wherein the width of the convex seam facing the gas guide member is from 80 to 120% the width of the gas discharge tube of the gas guide member.

7. The automotive airbag device according to claim 1, wherein the clearance between the gas guide member and the convex seam is less than 20 mm.

8. The automotive airbag device according to claim 1, wherein the gas guide member is made from an expandable material.

9. The automotive airbag device according to claim 8, wherein the flow of gas through the gas guide member causes the member to elongate, in a direction toward the convex seam, a distance at least 5 mm greater than a clearance therebetween.

* * * * *